(12) United States Patent
El-Hanany et al.

(10) Patent No.: US 6,946,660 B2
(45) Date of Patent: Sep. 20, 2005

(54) TWO-DIMENSIONAL RADIATION DETECTOR

(75) Inventors: Uri El-Hanany, Rehovot (IL); Arie Shahar, Moshav Magshimim (IL)

(73) Assignee: Orbotech Medical Solutions Ltd., Yavne (IL)

( * ) Notice: Subject to any disclaimer, the term of this patent is extended or adjusted under 35 U.S.C. 154(b) by 149 days.

(21) Appl. No.: 10/264,272

(22) Filed: Oct. 3, 2002

(65) Prior Publication Data

US 2003/0085358 A1 May 8, 2003

(30) Foreign Application Priority Data

Oct. 3, 2001 (IL) ................................................ 145745

(51) Int. Cl.⁷ ................................................ G01T 1/24
(52) U.S. Cl. ................................................ 250/370.13
(58) Field of Search ........................ 250/370.08, 370.13, 250/370.09, 370.1

(56) References Cited

U.S. PATENT DOCUMENTS

| | | | | | |
|---|---|---|---|---|---|
| 5,777,338 | A | * | 7/1998 | He ........................... | 250/385.1 |
| 6,037,595 | A | * | 3/2000 | Lingren ................... | 250/370.01 |
| 6,046,454 | A | * | 4/2000 | Lingren et al. ......... | 250/370.01 |
| 6,091,070 | A | | 7/2000 | Lingren et al. ......... | 250/370.09 |
| 6,236,051 | B1 | | 5/2001 | Yamakawa et al. ...... | 250/370.1 |
| 6,285,029 | B1 | * | 9/2001 | Shahar et al. .......... | 250/370.14 |

OTHER PUBLICATIONS

P.A. Glasgow, et al., "Aspects of Semiconductor Current Mode Detectors for X–ray Computer Tomography", Published in IEEE Transactions on Nuclear Science, vol. NS–28, pp. 563–571, Feb. 1981.

E.N. Arkad'eva, et al., "Possible Use of Cadmium Telluride for Detection of Pulsed X–rays in Medical Tomography", Published in Soviet Physics—Technical Physics, vol. 26, pp. 1122–1125, Sep. 1981.

\* cited by examiner

Primary Examiner—David Porta
Assistant Examiner—Marcus Taningco
(74) Attorney, Agent, or Firm—Ladas & Parry

(57) ABSTRACT

A two-dimensional, pixellated, monolithic semiconductor radiation detector, in which each detector pixel is essentially a perpendicular mode detector. This is achieved by an arrangement of anode spots, one for each pixel located on the flux-exposed front surface of the detector substrate, surrounding by a cathode array preferably in the form of a network of lines, such that the field between the anodes and cathodes on this front surface has a major component in the direction parallel to the surface, and hence perpendicular to the incident photon flux. The conductivity of the substrate is high near this front surface, since this is where the highest level of absorption of photons takes place, and a significant photoconductive current is thus generated between cathodes and anodes. The conductivity is proportional to the incoming photon flux, and decays exponentially with depth into the detector. Since all of the conduction paths are in parallel to each other, the resultant conductance between each anode and its surrounding cathode is the summation of all those conductances.

26 Claims, 7 Drawing Sheets

TWO-DIMENSIONAL RADIATION DETECTOR

FIELD OF THE INVENTION

The present invention relates to the field of semiconductor photon detector arrays, having the bias field perpendicular to the direction of incident radiation, especially for use in imaging applications.

BACKGROUND OF THE INVENTION

Current-mode detectors, operating in the photoconductive mode, are generally used whenever the flux of impinging photons is too intense to allow the counting of single photons. This is generally the situation in X-ray imaging. In such situations, the practical method for measuring the intensity of the radiation is to measure the average current stemming from charges created by absorption of a large number of photons. For example, the detectors presently used by Computerized Tomography (CT) imaging systems are scintillators coupled to photodiodes, designated hereinafter SPD's. Each X-ray photon absorbed within the scintillator creates a pulse of light, which is then detected by the photodiode and converted to multiple electron-holes pairs, with the number of those pairs being proportional to the energy of the absorbed X-ray photon. These charges are then sampled over a timeframe which is much longer than the average time between individual events of X-ray photon absorption within the scintillator. The read-out signal is thus proportional to the average current from the photodiode, which is proportional to the X-ray flux hitting the scintillator.

Two decades ago, there was already a trend in CT imaging technology to replace the SPD by all-semiconductor detectors. One of the first such examples is described in the article by P. A. Glasgow et al, entitled "Aspects of Semiconductor Current Mode Detectors for X-ray Computer Tomography", published in IEEE Transactions on Nuclear Science, Vol. NS-28, pp. 563–571, February 1981. Such detectors have the inherent advantage of operating in a direct conversion mode, i.e., the X-ray photon absorbed within the semiconductor volume is directly converted to electron-hole pairs. Such a direct conversion is an order-of-magnitude more effective than the previously used indirect conversion process of X-ray photons to light within the scintillator, and light to electron-hole pairs within the photodiode. For instance, in a detector made of CdTe or CdZnTe (CZT), the number of electron-hole pairs created by an absorbed X-ray photon of energy $E_0$ is approximately $E_0/4.4$ eV, whereas in a conventional SPD detector, the number is in the range typically of from $E_0/30$ eV to $E_0/60$ eV only. Semiconductor detectors are not only more efficient, but they also allow the fabrication of arrays of detectors over a monolithic slab of the semiconductor, with pixels of desired dimensions, especially of very small dimensions which are practically impossible to fabricate in conventional SPD structures. This is a very important advantage of semiconductor detectors over SPD detectors, since the trend in CT imaging technology is presently for many more channels of detection, using much smaller detectors to allow better spatial resolution. This trend is only feasible currently by replacing the SPD detectors with semiconductor detectors such as CdTe or CZT.

Such semiconductor detector operate in the current-mode by utilizing the photoconductive effect. When the X-ray flux is absorbed within the photoconductor (PC), the conductivity of the semiconductor essentially changes from its dark-value, determined by the thermal excitation of electrons within the bulk of the PC, to a higher conductivity, determined by the higher density of electrons created by the absorbed X-ray photons. Since the PC is kept under a bias voltage between two electrodes contacting its bulk, this change in conductivity is translated into a change in the resultant current, from that of the dark-current to that of the photocurrent.

It has been shown in an article entitled "Possible use of cadmium telluride for detection of pulsed X-rays in medical tomography" by E. N. Arkad'eva et al., published in Soviet Physics—Technical Physics, Vol. 26, pp. 1122–1125, September 1981, that for the PC detector to behave in an optimal way and to exhibit correct temporal behavior, the X-radiation should impinge on the PC detector in a direction perpendicular to the electric field established within the PC. If the X-radiation hits the PC detector parallel to the electric field, i.e. through the cathode or the anode, there will be temporal overshoot of the PC detector current in response to the incidence of an X-ray pulse. Furthermore, the PC detector photocurrent in this parallel mode is considerably smaller than that in the perpendicular mode.

However, according to the current state of detector technology, perpendicular-mode detectors can be fabricated only as rods, with the electrodes on the narrow sides thereof, and pixellated only in one dimension, namely the length of the rod. Consequently, one of the inherent advantages of using a semiconductor detector, namely, the possibility of fabricating two-dimensional pixellated monolithic arrays, cannot be realized. Detectors have been described in which one-dimensional arrays, i.e. pixellated rods, are stacked side by side to form a two dimensional array, but such an array is difficult to fabricate, and is thus costly. There therefore exists an important need for a two-dimensional pixellated monolithic array, capable of being used in the perpendicular mode, with the radiation impinging on the array in a direction perpendicular to the direction of the application of the bias field.

The disclosures of each of the publications mentioned in this section and in other sections of the specification, are hereby incorporated by reference, each in its entirety.

SUMMARY OF THE INVENTION

The present invention seeks to provide a novel, two-dimensional, pixellated, monolithic semiconductor radiation detector, in which each detector pixel is essentially a perpendicular mode detector. This is preferably achieved by an arrangement of anode spots surrounding by a cathode array preferably in the form of a network of lines, deposited on the flux-exposed front surface of the detector substrate, such that the field between the anodes and cathodes has a major component in the direction parallel to the surface, and hence perpendicular to the incident photon flux. The conductivity of the substrate is high near this front surface, since this is where the highest level of absorption of photons takes place, and therefore, a good level photoconductive current is generated between the front surface cathodes and anodes. This current is preferably measured in each pixel by means of current amplifiers connected to each anode. The conductivity is proportional to the incoming photon flux, and decays exponentially with depth into the detector. Since all of the conduction paths are in parallel to each other, the resultant conductance between each anode and its surrounding cathode structure is the summation of all those conductances. The current measured by the current amplifier is thus proportional to the total X-ray flux incident within that pixel.

According to an additional preferred embodiment of this invention, a second set of anodes and cathodes are located on the rear surface, thereby increasing the efficiency of the detector by collecting electrons generated at the rear of the detector, which would otherwise not be measured by the front set of electrodes.

Furthermore, by connecting all of the front surface electrodes together electrically, to form a single cathode structure, the rear anodes can be used for single event photon counting at low incident flux levels, with all the advantages which this measurement offers at low flux levels. The transition from photoconductive measurements to single photon counting measurements can be performed automatically according to the flux level detected by the measurement system.

The perpendicular mode field configuration can be advantageously used, according to further preferred embodiments of the present invention, to enable the execution of photon counting measurements at flux levels substantially higher than those achievable using the prior art parallel field configuration. The efficiency of prior art photon counting detectors falls drastically with increasing incident flux, because the high conductivity regions generated near the front surface of such detectors essentially prevents the production of an electric field in those regions, and therefore prevents the electrons generated therein from being attracted across the conductivity gradient towards their collection anodes. With the field applied perpendicularly to the flux direction, and hence perpendicular also to the conductivity gradient, the field seen by electrons generated in the substrate is independent of the depth of penetration, and such electrons are therefore all influenced by the same approximate level of perpendicular field, independently of the conductivity of the region in which they are generated. According to these additional embodiments of the present invention, at flux levels which, according to prior art detector technology, mandated the use of photoconductivity measurements, it therefore becomes possible to use the methods of photon counting, with their concomitant advantages, rather than photoconductivity measurements.

There is thus provided in accordance with a preferred embodiment of the present invention, a two dimensional planar radiation detector comprising a semiconductor substrate having a first surface for exposure to the radiation, and an array of anodes and cathodes disposed on the surface, such that the electric field produced between at least one of the anodes and its associated cathodes has a substantial component perpendicular to the direction of impingement of the radiation.

The detector may preferably be adapted to be aligned relative to the radiation such that the substantial component of the electric field produced between at least one of the anodes and its cathode is essentially perpendicular to the direction of impingement of the radiation. In the above mentioned detectors, the array of cathodes may be in the form of a net of cathodes, having an anode within each cell of the net. At least one of the cathodes may preferably be essentially square in shape, and at least one of the cathodes may be unclosed in form.

There is further provided in accordance with yet another preferred embodiment of the present invention, a radiation detector as described above, wherein the radiation is operative to generate a conductive region in the substrate, close to the first surface, such that a photocurrent flows between at least one of the anodes and its cathode. The photocurrent is preferably dependent on the intensity of the radiation.

In accordance with still another preferred embodiment of the present invention, in the radiation detector as described above, the electric field may be such that the substantial component is essentially constant in the direction perpendicular to the first surface. The radiation is then preferably operative to generate a conductive region in the substrate, close to the first surface, and an electron generated in the conductive region sees the same substantial component of the field, as an electron generated outside of the conductive region.

Any of the radiation detectors described above, according to more preferred embodiments of the present invention, may also comprise a second surface distant from the first surface, on which second surface may be disposed a second array of anodes and cathodes such that a substantial component of the electric field produced between at least one of the anodes and its cathode of the second array is essentially parallel to the second surface. The second array of anodes and cathodes is preferably operative to measure a photocurrent arising from electrons generated in the substrate and not measured by the array of anodes and cathodes on the first surface. The ratio between the photocurrents on the first and the second surfaces may then preferably be used to provide an indication of the hardness of the radiation.

There is further provided in accordance with still another preferred embodiment of the present invention, a radiation detector as described above, and also comprising a second surface distant from the first surface, and wherein on the second surface is disposed an electrode maintained at a negative potential relative to the front surface anodes and cathodes, and wherein the electrode is operative to repel electrons generated near the rear surface back towards the front surface anodes and cathodes.

In accordance with further preferred embodiments of the present invention, there are also provided radiation detectors as described above, and also comprising a second surface distant from the first surface, and wherein on the second surface is disposed an array of anodes, operative to perform photon counting measurements on electrons not measured by the front surface array of anodes and cathodes.

The substrate in any of the above mentioned radiation detectors is preferably cadmium zinc telluride.

There is also provided in accordance with yet a further preferred embodiment of the present invention, a method of performing photon counting measurements on a radiation flux, comprising the steps of providing a semiconductor substrate having a first surface for exposure to the radiation flux, disposing on the first surface an array of anodes and cathodes, such that a substantial component of the electric field produced between at least one of the anodes and its cathode is essentially parallel to the first surface, and measuring at the at least one of the anodes, the charge arising from individual photon absorptions in the substrate. The photon counting may be performed at flux levels which generate significant conductive regions in the substrate.

Furthermore, according to another preferred embodiment of this method, a second plurality of anodes and cathodes may be disposed on the second surface of the substrate, such that an electric field produced between at least one of the anodes and an associated cathode of this second plurality has a component parallel to the second surface, and the charge arising from an individual photon absorption in the substrate is measured by at least one of the second plurality of anodes.

Additionally and preferably, at least one second anode electrode maintained at a positive potential relative to the plurality of first surface anodes and cathodes may be disposed on the second surface, and the the charge arising from an individual photon absorption in the substrate is measured by at least one of the at least one second anode electrodes.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1B:
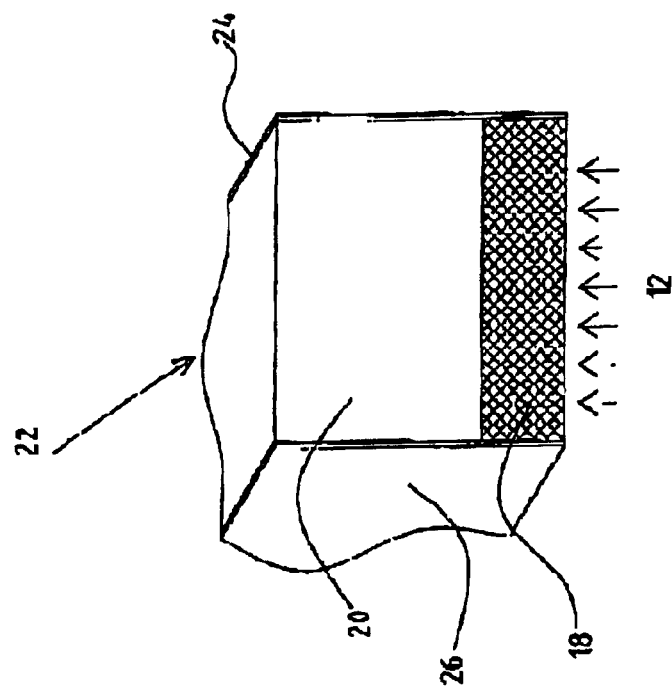
FIG. 1B is a schematic representation of the cross section of a prior art, perpendicular-mode, photoconductive detector, with the photon flux impinging on the detector in a direction perpendicular to the bias field.
Figure 1A:
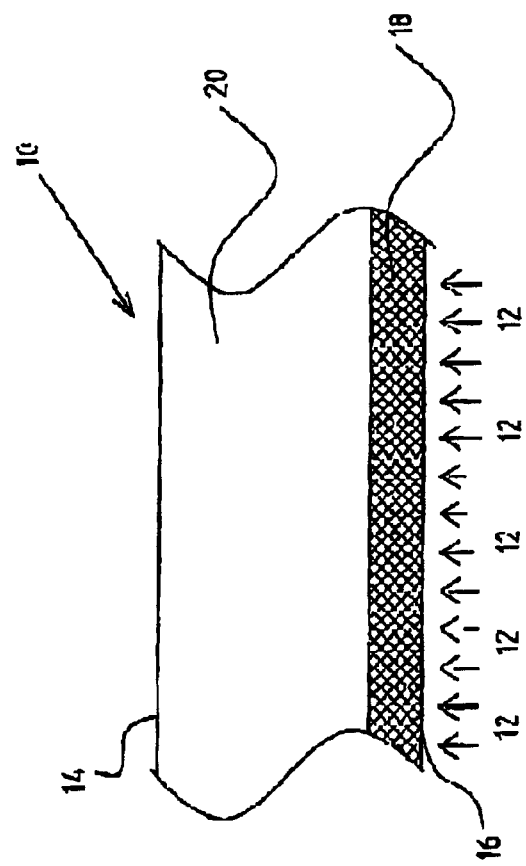
FIG. 1A is a schematic representation of the cross section of a prior art, parallel-mode, photoconductive detector, with the photon flux impinging on the detector in the same direction as the bias field.

Reference is now made to FIG. 1A, which schematically illustrates the cross-section of a prior art, parallel-mode, photoconductive detector 10, with the photon flux 12 impinging on the detector in the same direction as the bias field. The bias field is applied between anode 14 and cathode 16 on opposite faces of the detector crystal. The effect of the incident flux of photons is to produce a low resistance layer 18 in the region where the absorption takes place, but in the remainder of the detector depth 20, the resistivity remains at its original high level. As a result, the current through the detector remains limited by the high resistance region, and the resulting sensitivity to the photon illumination is low. This explains a major disadvantage of the parallel mode of operation of such photoconductive detector arrays.

Reference is now made to FIG. 1B, which schematically illustrates the cross-section of the end view of a prior art, perpendicular-mode, photoconductive detector 22, with the photon flux 12 impinging on the detector in a direction perpendicular to the bias field. The photon flux 12 produces the same low resistivity layer 18 as in the embodiment shown in FIG. 1A, with the remainder of the detector crystal 20 retaining its dark-level high resistivity. The bias field is applied between anode 24 and cathode 26 on opposite faces of the detector crystal, but unlike the embodiment shown in FIG. 1A, the direction of the bias field is perpendicular to the incident flux direction. As a result, even though in the example shown in FIG. 1B, the bulk of the detector crystal 20 has a high resistivity, there is a reasonable photoconductive current between anode and cathode through the low resistivity layer 18. The sensitivity of this detector arrangement is therefore generally significantly higher than that of the parallel mode detector scheme of FIG. 1A. However, the geometry of the detector shown in FIG. 1B is one dimensional, in a direction perpendicular to the end face shown in the plane of the drawing, and it would be very advantageous to provide a perpendicular-mode detector being two dimensional in both directions across the plane of the incident photon flux 12.

Figure 2:
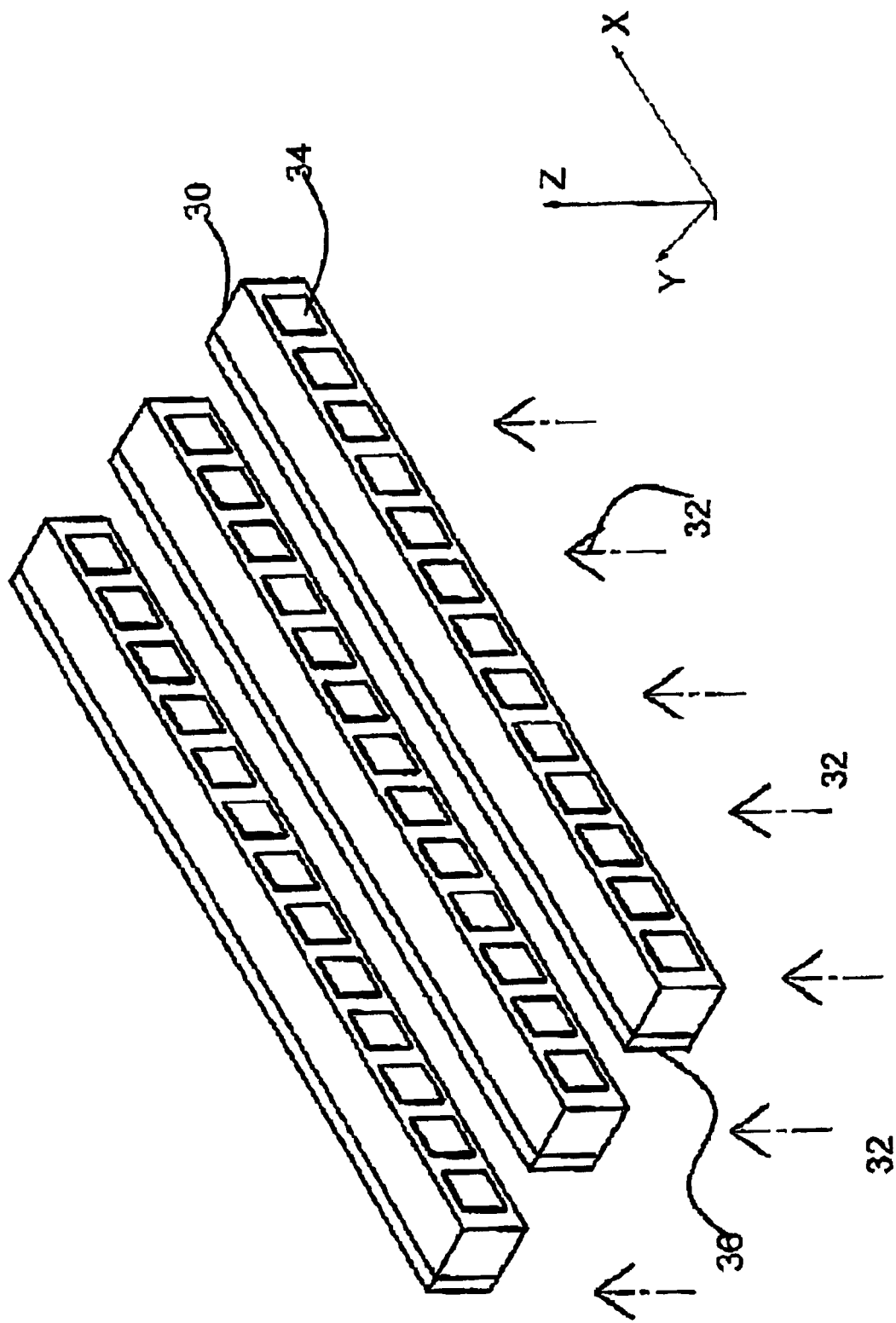
FIG. 2 is a schematic drawing of a prior art stack of perpendicular-mode rod detectors, providing a two-dimensional perpendicular-mode detector array.

Reference is now made to FIG. 2, which is a schematic drawing of a prior art stack of perpendicular-mode rod detectors such as those shown in FIG. 1B. Each of the rod detectors 30 has a one-dimensional x-axis array of anodes 34 along one surface, and a cathode electrode 36 on the opposite surface. The rod detectors are aligned such that the photon flux 32 is incident on each rod detector in the z-direction, which is perpendicular to the direction of the electric field between the anode and cathode surfaces. In this way, each rod detector has the high sensitivity characteristic of perpendicular-mode detector operation. The second dimension in the plane of the photon flux is provided by providing an array of such perpendicular-mode rod detectors, stacked in the y-direction, such that a complete two-dimensional x-y plane perpendicular-mode detector array is provided. The embodiment shown in FIG. 2, though generally better in performance than prior art parallel-mode arrays, is however, complicated to construct, since it involves mechanical and electrical assembly by integration of a number of separate rod detector elements. This makes such an array costly and time-consuming to manufacture. It would therefore be very advantageous if such a perpendicular mode detector array could be provided using the widely used and cost-effective planar monolithic fabrication methods.

Figure 3:
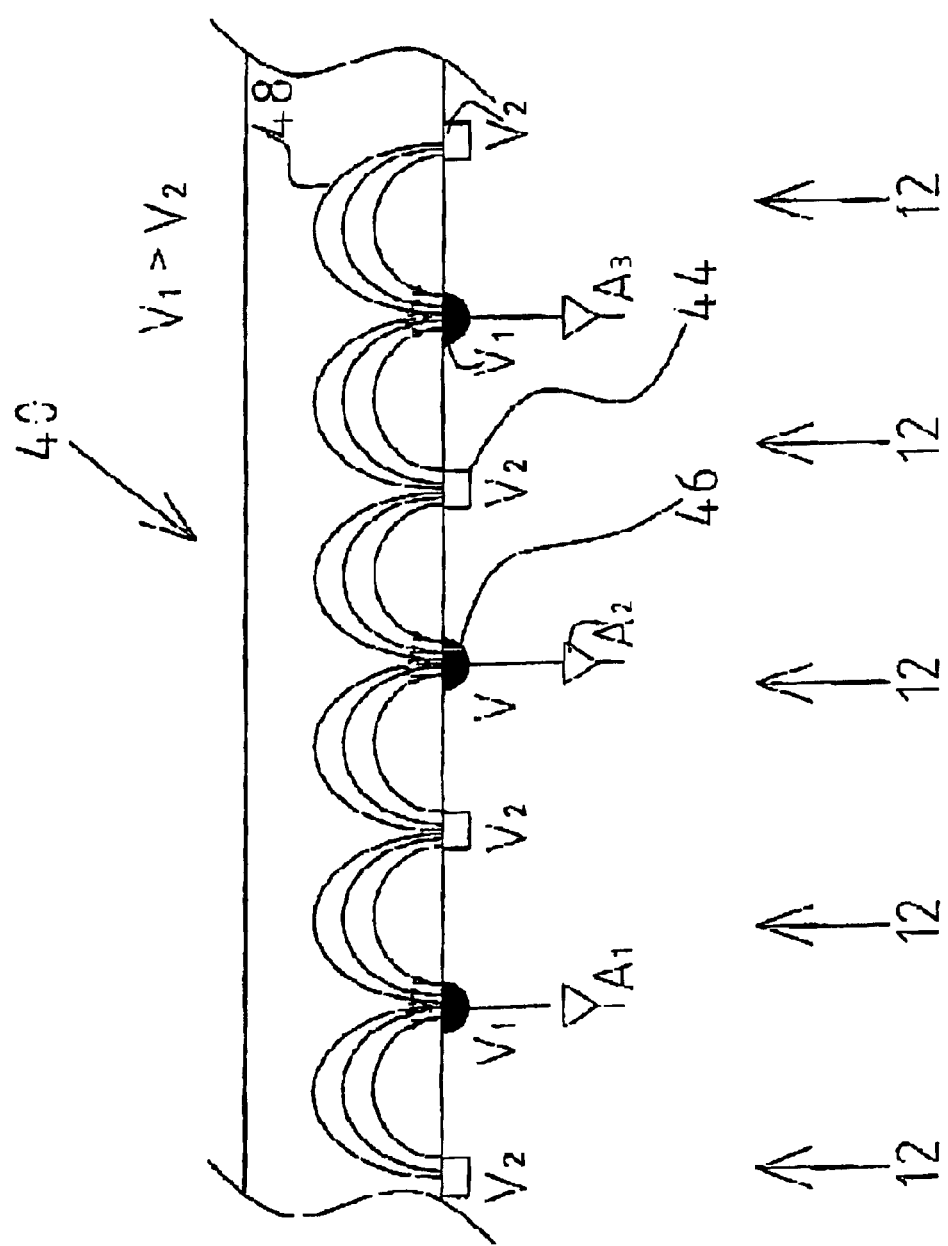
FIG. 3 is a schematic cross-sectional drawing of a planar monolithic two-dimensional perpendicular-mode detector array, constructed and operative according to preferred embodiment of the present invention.
Figure 4:
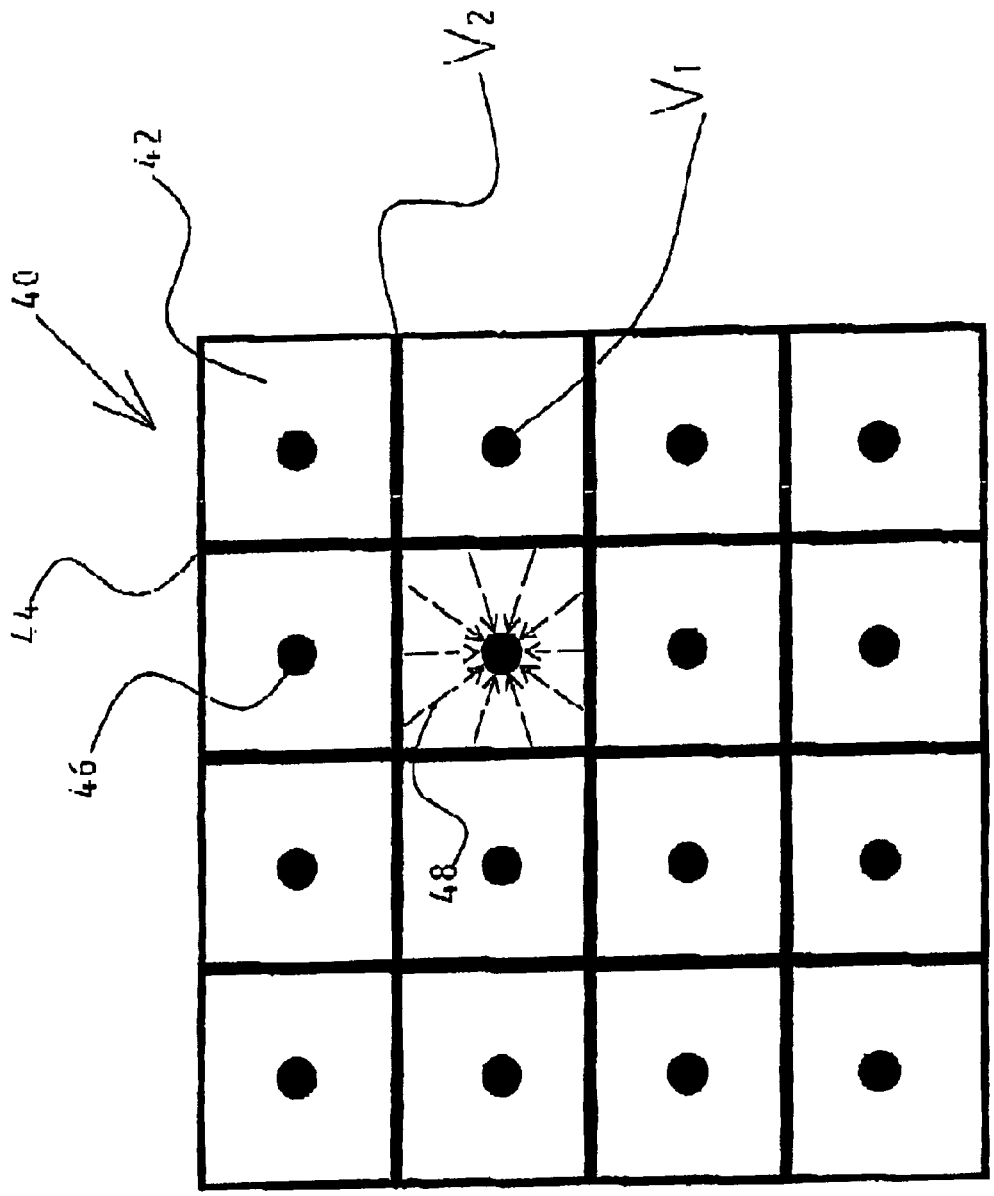
FIG. 4 is a plan view of the detector array of FIG. 3, showing a preferred arrangement of the electrode structure.

Reference is now made to FIGS. 3 and 4, which schematically illustrate a two-dimensional, perpendicular-mode, planar detector array, constructed and operative according to a preferred embodiment of the present invention. FIG. 3 is a schematic cross-sectional drawing of the detector array, while FIG. 4 is a plan view of the detector array of FIG. 3. The same reference numbers are used for the same features in both of these drawings. The detector array is preferably constructed by conventional monolithic fabrication technology. The material of the detector is preferably any semiconductor material which is sensitive to the incoming radiation to be imaged, and especially the commonly used cadmium telluride or cadmium zinc telluride.

The semiconductor detector array 40 is arranged such that the photon flux 12 to be imaged is incident on one planar face 42. On this face 42, there is deposited a net shaped electrode 44, preferably of square shape, each square constituting a single pixel of the detector array. The pitch of the net is preferably of the order of 1 mm. or even less, to provide good image resolution over the detector surface. A voltage V2 is applied to this net shaped electrode. Inside each square of the net shaped electrode 44, there is deposited a contact dot 46, to each of which is applied a voltage V1. V1 is held at a higher potential than V2, such that the net shaped electrode is operative as the cathode, and each central dot is operative as the anode of its pixel. The currents detected in each pixel are measured, preferably by means of current amplifiers, shown in FIG. 3 as A1, A2, A3 . . . , such that a complete two-dimensional electronic image of the incident radiation may thus be obtained.

This geometrical arrangement of anodes and cathodes disposed on one surface of the detector substrate results in a curved field pattern 48 between each anode dot and its surrounding cathode. X-radiation impinging on the planar face 42 of the detector array results in a conductivity gradient in the substrate material, which may thus distort these conductive paths in comparison with an unradiated high resistivity substrate, but the basic curved nature of the conduction path shape is maintained. Though the trajectories of these conductive paths are curved, the field produced in the detector has a major component parallel to the surface 42 of the detector, and hence generally perpendicular to the incident photon flux, and the detector thus operates essentially in the perpendicular mode. The paths nearer to the face 42 are more conductive than those deeper in the material, since the conductivity is a function of the absorbed radiation, and the X-ray radiation is absorbed in an exponentially decreasing manner. However, since all of these paths conduct in parallel to each other, the resultant conductance between each anode and its surrounding cathode structure is the summation of all those conductances. The current measured by the current amplifier, if such is used for the measurement, is thus proportional to the total X-ray flux incident within that pixel. It is thus evident that the arrangement of the electrodes of the embodiment shown in FIGS. 3 and 4 is such as to cause the detector array to operate in the perpendicular mode, and in a manner whereby the detected current provides a generally accurate measure of the incident photon flux.

However, in contrast to the prior art detector array shown in FIG. 2, the preferred embodiment of FIGS. 3 and 4, and all the subsequent embodiments shown hereinbelow, all according to the present invention, are capable of being constructed in planar geometry, thus providing the advantages of perpendicular-mode detection with the cost-effectiveness of monolithic planar fabrication techniques. The embodiment of FIG. 4 shows all of the cathode net connected together, such that the whole net could be described as being a single cathode. Throughout this specification, however, and as claimed, the term cathode is understood to mean that part of the net which is in close electrical field proximity to a corresponding anode. The net is thus understood to be made up of a plurality of cathodes, each providing the opposing negative potential for a corresponding anode. This combination of an anode with its surrounding cathode then constitutes a detector pixel. Though the embodiment of FIG. 4 shows a net of square cathodes surrounding the anodes, it is to be understood that the invention is not limited to such a cathode geometry, and is operable with a net of cathodes of any shape, so long as they provide a net transverse field component with respect to the anodes. Additionally, although the anode is shown as a dot, it is to be understood that the invention is not limited to such an anode shape, but is operable with any shaped anode, so long as it is within the confines of its surrounding cathode field. Furthermore, though the cathodes are shown in the embodiment of FIG. 4 as a closed and continuous net structure, it is to be understood that they can also have openings so long as electrical contact is ensured to every cathode cell, and that a net transverse field is provided between each cathode cell and its anode. In addition, although the embodiment of FIGS. 3 and 4 has been shown with a net of cathodes, and an anode inside each cathode cell, it is to be understood that the invention will also operate with V1<V2, such that there is a net of anodes, and a cathode inside each anode cell.

Figure 5:
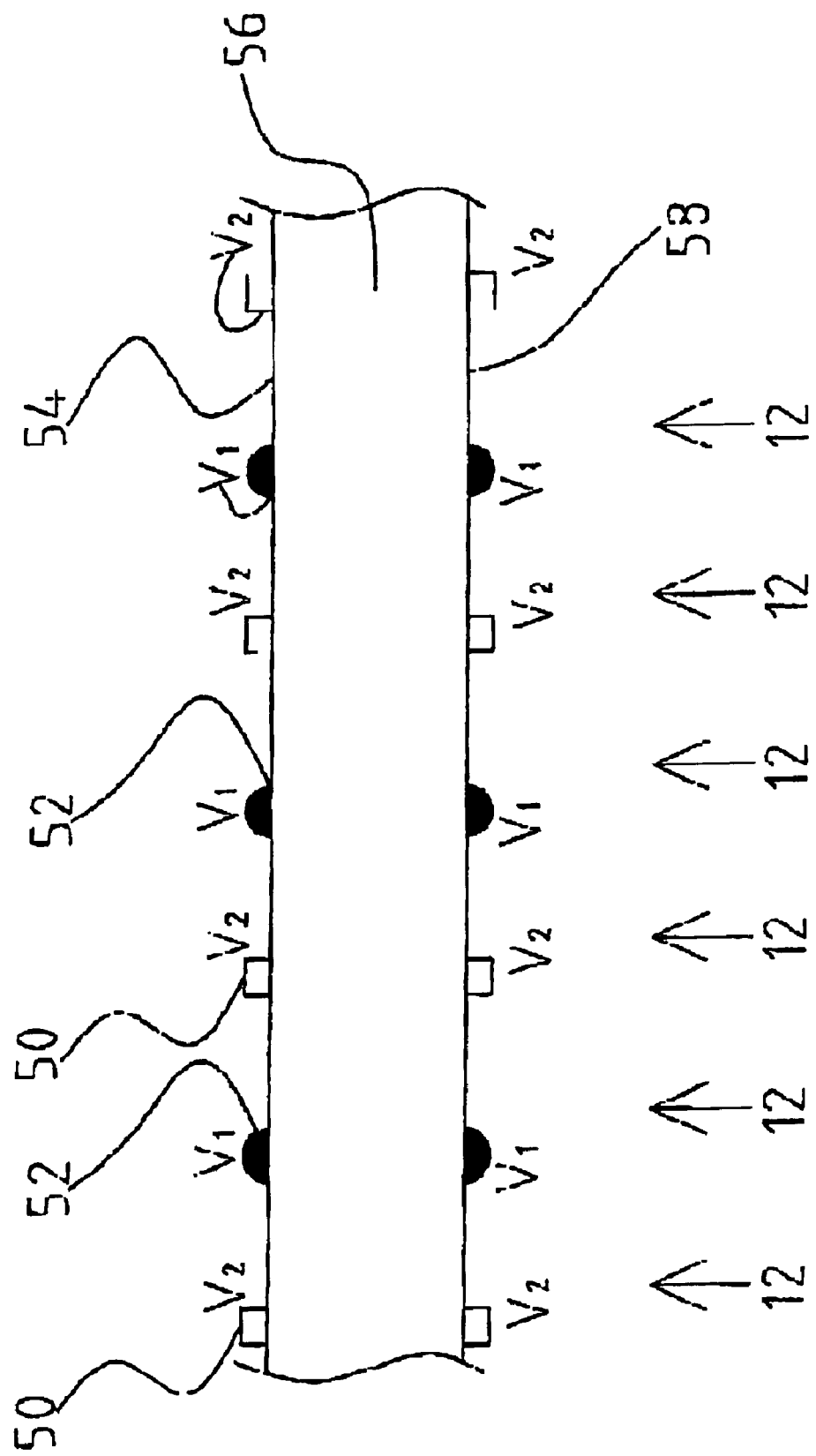
FIG. 5 is a schematic cross-sectional illustration of a further preferred embodiment of the present invention, similar to that shown in FIGS. 3 and 4, but with a second set of cathodes and anodes on the back face of the detector crystal.

Reference is now made to FIG. 5, which is a schematic cross section illustration of a further preferred embodiment of the present invention. The detector array of FIG. 5 is similar to that shown in FIGS. 3 and 4, except that a similar arrangement of cathodes 50 and anodes 52 are also provided on the back face 54 of the detector crystal 56, remote from the photon flux 12. The photoconductive effect on the back face 54 is much smaller than that on the front face 58, since the X-ray radiation, or other measured radiation, reaching the back face is attenuated by the thickness of the semiconductor wafer. However, according to the embodiment of FIG. 5, this backside signal is not wasted but is added to the front side signal to increase the total signal measured. Though not shown in FIG. 5, it is understood that the currents collected by the anode dots may preferably be measured by means of current amplifiers.

The back surface signal obtained using the preferred embodiment of FIG. 5 can also be used, according to the method of a further preferred embodiment of the present invention, to derive information as to the spectral make-up of the X-ray radiation, or other radiation detected. Since harder (higher energy) radiation penetrates the depth of the detector crystal further than softer (lower energy) radiation, harder radiation also exhibits a relatively larger back surface signal than that of softer radiation. A comparison of the back surface signal with that of the front surface signal enables information to be obtained as to the spectral make-up of the X-ray radiation. This information is valuable to CT image interpretation, since X-rays traveling through thicker body tissues are hardened relative to the original incident X-ray radiation. This discrimination between front and back surface signals can also be facilitated by selection of the comparative anode voltages applied to the front and back surface anodes, as will be discussed in detail below in connection with the embodiment of FIG. 6.

Figure 6:
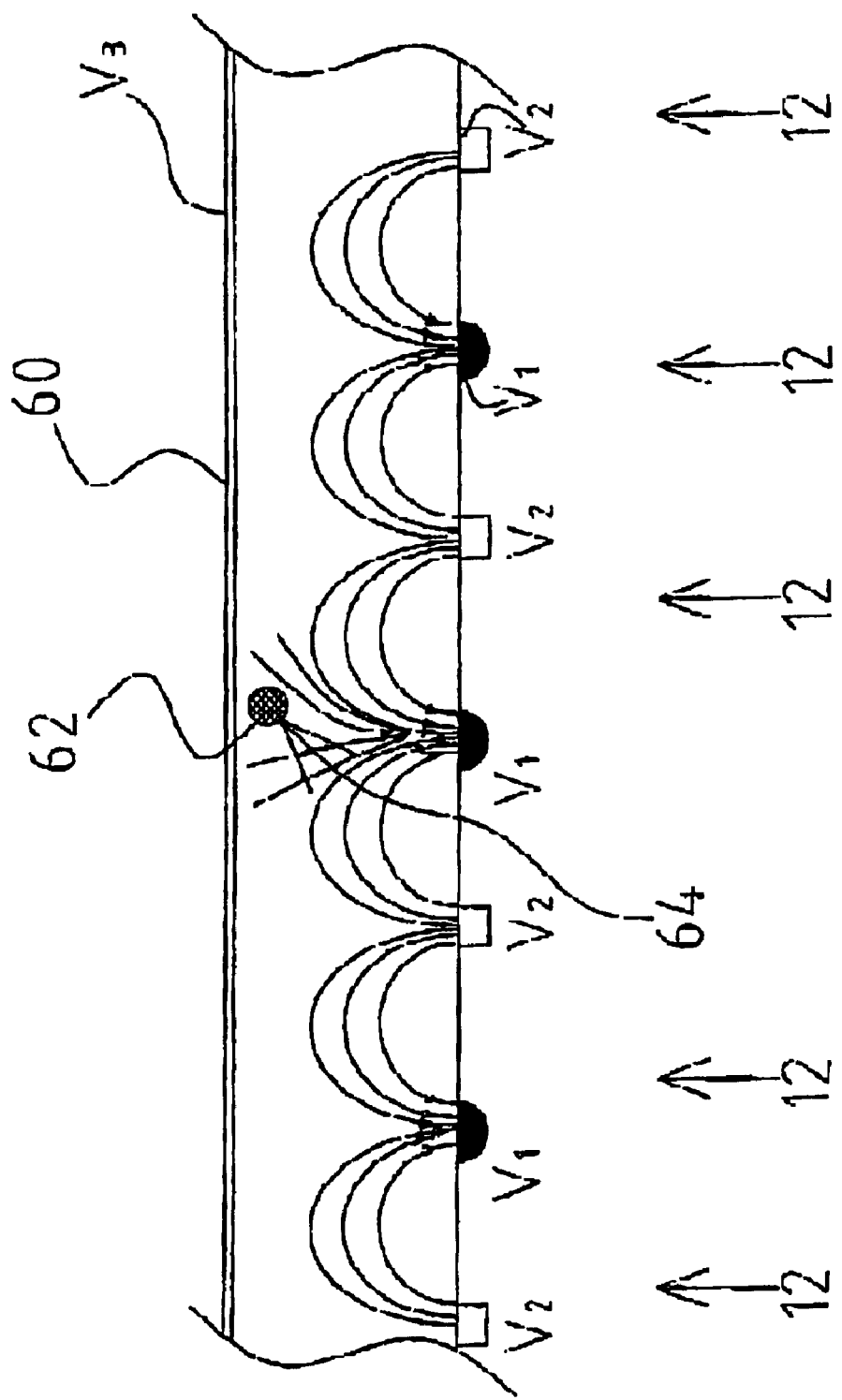
FIG. 6 is a schematic cross-sectional illustration of a further preferred embodiment of the present invention similar to that shown in FIGS. 3 and 4, but with a continuous cathode with a negative applied voltage disposed on the rear surface to reject any electrons generated near or reaching the vicinity of the rear surface.

Reference is now made to FIG. 6, which is a schematic cross-sectional illustration of a further preferred embodiment of the present invention. The detector array of FIG. 6 is similar to that shown in FIGS. 3 and 4, except that an additional cathode 60 with an applied voltage V3 is disposed on the rear surface, remote from the photon flux 12. This cathode is preferably a continuous electrode, and the value of V3 is made sufficiently negative that the cathode 60 acts as a rejecting electrode to any electrons in its vicinity. For a pixel of dimensions 1 mm×1 mm in a 3 mm thick CdZnTe detector, typical values of these voltages which have been found to operate satisfactorily are V1=0, V2=−20V, V3=−200V. Thus, an electron 62 produced by impact of an energetic photon 64 far from the front surface anode-cathode arrangement, which would otherwise not be collected by the front-surface anodes, is repelled by the back surface cathode 60, such that it travels in the direction towards the front surface, where it is collected and measured by a front surface anode dot. The use of the rear cathode embodiment is thus another preferred method for increasing the sensitivity of the single-sided detector shown in the embodiment of FIGS. 3 and 4.

Though not shown in either FIG. 5 or FIG. 6, it is to be understood that the currents collected by the anode dots are preferably measured by means of current amplifiers, though, as will be discussed hereinbelow, other measurement schemes may also be preferably used.

The depth in the detector at which an electron is produced from an absorption event is dependent on the hardness of the incident radiation. The location from which an electron is influenced to move towards the front surface is dependent on the magnitude of the rear cathode voltage V3 relative to the anode voltage V1 and the front cathode voltage V2. Consequently, according to another preferred method of the present invention, V3 can be chosen in order to select the radiation hardness at which an electron arising from absorption of that radiation is deflected forward and detected.

Figure 7:
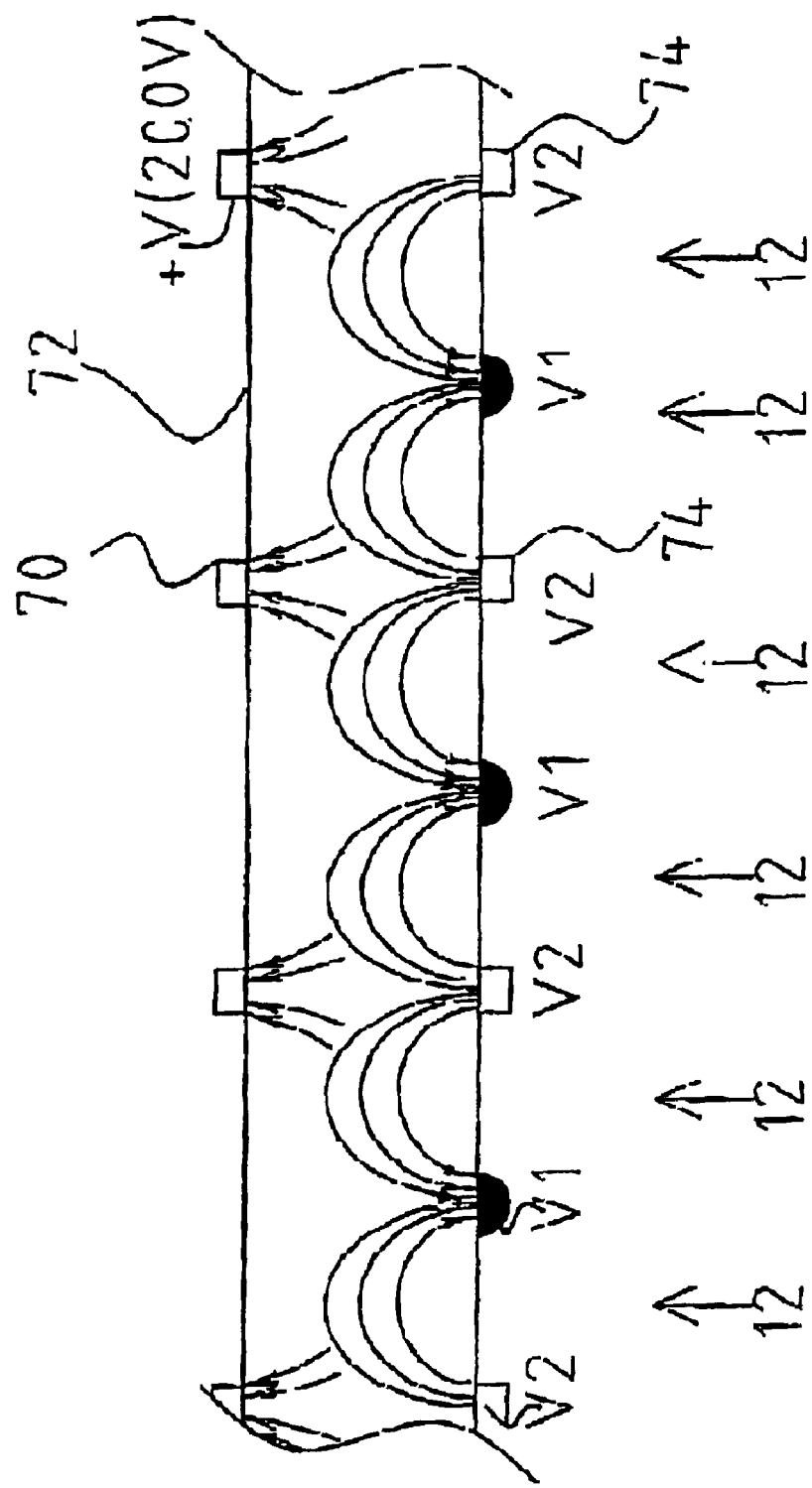
FIG. 7 is a schematic cross-sectional illustration of a further preferred embodiment of the present invention similar to that shown in FIGS. 3 and 4, but with an additional array of anode spots disposed on the rear surface.

Reference is now made to FIG. 7, which is a schematic cross-sectional illustration of a further preferred embodiment of the present invention. The detector array of FIG. 7 is similar to the embodiment shown in FIGS. 3 and 4, except that an additional array of anode spots 70 is disposed on the rear surface 72, i.e. that remote from the photon flux 12, and preferably opposite the cathode net lines 74 on the front surface. A large positive voltage, typically of the order of 200 volts, is applied to these rear surface anode spots 70, such that they are attractive to any electrons in their vicinity. According to this preferred embodiment, the array of anodes and cathodes on the front surface operates to measure the photon flux by means of the photoconductive mode described in the embodiment of FIGS. 3 and 4. Though not shown in FIG. 7, it is understood that the currents collected by the anode dots on the front surface are generally measured by means of current amplifiers. Any electrons which get past the front surface field and are not collected by the front surface anodes, or which are generated by absorption events near the rear surface, are attracted by the large positive voltage on the rear surface anode dots 70, and are collected there. Since the number of such electrons is generally low, they can be measured by means of the type of circuitry used for individual photon counting. Since the electrons which do get past the front surface field are generally those which are generated by events in the areas behind the regions of the cathode net lines 74, and therefore out of the field of influence of the front surface anodes, the rear surface anode dots 70 are preferably located directly behind the front surface cathode net lines 74.

The detector in the embodiment of FIG. 7 is therefore operative to simultaneously perform photoconductive current measurements on the front surface and photon counting measurements on the rear surface. The value of the rear anode voltage, shown in the preferred embodiment of FIG. 7 as 200 volts, can be adjusted according to the hardness of radiation that is to be detected at the rear surface.

According to yet a further preferred embodiment of the present invention, the embodiment shown in FIG. 5, in which measurement is performed on the rear surface also, can be used in another mode of operation. In high energy resolution gamma photon imaging, as is common in Nuclear Medicine Imaging, the pixel size commonly used is of the order of at least a few millimeters, since the low rate of gamma photons events typical to Nuclear Medicine Imaging applications, would not generally allow adequate photon statistics using smaller pixels. Therefore, according to this additional preferred mode of operation, the photon counting measurement on the back surface is performed by integrating the electrons collected over a group of dots on this surface, instead of measuring the electrons collected at each dot separately. A typical embodiment for such a detector with a 1 mm pitch net dimension, is to take a group of nine such dots and to join them electronically to form an effective 3 mm×3 mm anode pixel. The potential of the net on the rear surface can preferably be either floating, or slightly more negative than the rear surface anode, so as to assist in deflecting the electrons towards the dots. Both the net and the dots on the front surface are preferably set at the same potential, which is negative relative to that of the dots on the back surface, and thus serves as the common cathode of the detector. Thus, according to this preferred embodiment, the same detector which is used for high flux level X-ray measurements, can be also be used for high sensitivity Nuclear Medicine Imaging applications.

According to further preferred embodiments of the present invention, any of the embodiments shown in FIGS. 5 to 7, having electrodes on the front and back surfaces of the detector substrate, and operating in the perpendicular mode, can be used in another mode of operation. These embodiments are able to switch from the above-described photoconductive types of measurement at high photon flux levels, to photon counting measurement at similar or somewhat lower photon flux levels. These detectors are thus designated hybrid measurement photon detectors. They are operable by a method, according to another preferred embodiment of the present invention, whereby photon counting is useable over a wider range of incident photon fluxes than is possible under prior art methods of photon counting. The flux levels at which these novel methods of photon counting can be applied is dependent on the pixel size used and the speed of the electronic circuitry used for the detection.

Photon counting is an advantageous mode of flux measurement compared to the photoconductive mode of measurement, since the individual counting of each photon absorbed makes the flux determination highly linear, and the dynamic range of this measurement is thus practically unlimited. The resultant practical outcome of photon counting is a broader range of image gray levels, enabling the attainment of better image contrast and accuracy, as compared to that achievable in the photoconductive mode. Furthermore, the circuits used for photon counting methods measure the charge which each individual photon event generates, and since this charge is dependent on the individual photon energy, photon counting methods are also generally able to determine the incident photon energy spectrum. However, photon counting methods as applied to prior art detectors, are only practical at low photon flux levels, as will be explained hereinbelow.

According to further embodiments of the present invention, the advantages of photon counting can be utilized at levels of input photon fluxes, in the same detector as is used for perpendicular mode photoconductivity measurements when the input flux is high, by using the front and rear surface electrode arrays in a different manner for the two cases. When the photon flux is high, the photoconductivity measurement is performed by the front face anode and cathode electrodes, with or without the assistance of the rear face electrodes, as described in detail in the previously mentioned embodiments. However, as soon as the incident flux is at a level low enough to allow efficient photon counting, circuitry in the detection system is operative to sense the low flux level, and the detection system is automatically switched to the photon counting mode. In this mode, the potentials on the cathode net and the anode dots on the front surface are equalized (V1=V2), and a positive voltage, relative to the front surface potential, is applied to the anode dots on the rear surface. This positive voltage is designated V3, where V3>V1, V2. The front face electrodes together serve as a common cathode, whereas each dot on the rear surface act as the collecting anode for its specific pixel, and individually counts the absorbed X-ray photons. The potential of the net on the rear surface can preferably be set so that the net deflects oncoming electrons towards the back face dots, as is well known in the photon-counting art. This increases the efficiency of the counting.

According to the methods of the prior art, at low flux levels photon counting measurements can be readily performed in the conventional parallel mode of operation of a detector. At such low flux levels, there is no significant change in the resistivity of the detector material from its dark value, and the field within the detector is comparatively undistorted, and reasonably uniform from the front to the back of the material. Thus, when a photon, such as an X-ray photon, strikes the detector on its front cathode face and is absorbed in the bulk, the electrons generated by the absorption travel quickly under the influence of this field to the anode on the back surface, from which they are collected and measured by the photon counting circuitry. In a nuclear medicine imaging application, where the incoming photon is a high energy gamma ray photon, the circuitry also determines the photon energy from the number of electrons generated per event.

As the flux level increases, however, as is the case with the X-ray photons in CT applications, the front of the detector material, where the photons are absorbed, becomes increasingly conductive, as described above for the photoconductive embodiments of this invention. As a result, the field profile from front to back of the detector becomes very non-uniform, with almost zero field at the front end where the material is very conductive. As a consequence, electrons generated by photon absorption in this region remain almost static, and do not readily reach the back regions of the detector, where the material still has its dark-level high resistivity, and where most of the field is thus generated, and from where they can be swept by this field to the anode and measured. Thus, the same mechanism of high conductivity generated in the regions of high photon flux absorption, that prevents efficient photoconduction detection in the parallel mode at high photon fluxes, also prevents efficient photon counting measurements at high flux levels. This result may be unsurprising, since one of the basic differences between photoconductive operation and photon counting operation lies only in the electronic measurement technique applied in the two cases. When the electronics is fast enough to discriminate between individual photon events, then the measurement is defined as a photon counting measurement, whereas, when the electronics cannot discriminate between electrons arising from different events, because the flux is so high, the circuit simply integrates the electron flow, and provides a photoconductivity measurement.

As a result of the foregoing phenomenon, according to more preferred embodiments of the present invention, there are provided methods for performing photon counting even at high photon fluxes. By operating any of the perpendicular mode embodiments of FIGS. 3 to 7 in a photon counting arrangement, the same factors which allowed the photoconductive measurements to operate efficiently even at high flux levels, are also operative to allow for more efficient photon counting measurements. The field non-uniformity is not now in the direction of the depth of the detector, but in the transverse direction, between the cathode net lines and the anode dots. The curved paths shown in FIG. 3 to represent conduction paths for the photoconductive embodiments can, for the photon counting embodiments, now be considered to represent field lines running between the anode and cathodes. Since the potential difference between anode and cathode of the pixels is constant, the electric field generated along any of the field lines between anode and cathode is of the same order of magnitude (since the field lines are of the same order of length), regardless of the conductivity of the material in which the field is situated. Therefore, electrons generated near the front of the detector material, even in a highly conductive region, essentially see approximately the same field as that seen by electrons generated deeper in the detector in high resistivity regions, and all are swept transversely by the anode-cathode field to the anodes, where they are collected and measured by the photon counting circuitry. Thus, photon counting can be performed using the above-described perpendicular mode embodiments of the present invention, even at higher photon fluxes, which would prohibit such measurements in prior art parallel mode detectors.

The flux level at which the photon counting mode is possible in all of the above described embodiments is determined as that for which the speed of response of the measuring electronic circuitry allows individual measurement of each absorption event for the pixel size used. As an example of this criterion, the highest flux levels currently detected in CT measurements is typically of the order of $4 \times 10^{10}$ photons/cm$^2$/sec. For a high resolution image with a very small pixel size, such as 0.15 mm×0.15 mm, the electronic measurement circuit must therefore be fast enough to measure at a rate of 10 MHz to keep track of each individual photon event. The characteristic time-scale of electronic pulses resulting from the electrons generated by an X-ray photon absorption event, which are detected and measured in such CT systems, is of the order of several nanoseconds, such that the amplification circuitry and components can easily handle the required 10 MHz measurement rate.

On the other hand, if a larger pixel size were to be used, such as 1.5 mm×1.5 mm, the required speed would be of the order of 1 GHz, a rate which is not currently easily achievable in quantitative amplification and measurement circuitry. Photon counting techniques can, however, be used for the large pixel sizes typically used in nuclear medicine gamma ray imaging, since the flux detected is so low that the electronics has no difficulty in keeping track of the individual events, even in such large pixels.

It can thus be stated that, by use of the methods and devices of the various embodiments of the present invention, photon counting can be used, when the conditions enable its use, as a replacement for prior art photoconduction methods, with all the inherent advantages of photon counting, on condition that the pixel size is maintained within the limits which allow the circuitry to keep track of the rate of photon absorption events occurring in each pixel.

According to these preferred embodiments of the present invention, there is therefore provided a universal type of photon detector, which is operable in the same physical configuration at high or low flux levels, for photoconductivity or for photon counting applications, and for nuclear medicine gamma imaging applications, and even including energy resolution measurements. Switching between the different measurement modalities is performed by selection of the relative potentials applied to the electrodes, and by selection of the way in which the electrodes are connected, as expounded in detail in connection with the above-described preferred embodiments of the present invention. All of these functions can be performed by means of switching of the electronic circuitry associated with the measurement of the currents or charges generated by the radiation.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A radiation detector comprising:
   a semiconductor substrate comprising a first surface for exposure to said radiation and a second surface opposite said first surface;
   a plurality of anodes and cathodes disposed on said first surface, such that an electric field produced between at least one of said anodes and an associated cathode has a component generally parallel to said first surface; and
   a second plurality of anodes and cathodes disposed on said second surface, such that an electric field produced between at least one of said anodes and an associated cathode of said second plurality has a component parallel to said second surface.

2. A radiation detector according to claim 1, and wherein said second plurality of anodes and cathodes is operative to measure a current arising from electrons generated by said radiation in said substrate and not measured by said plurality of anodes and cathodes on said first surface.

3. A radiation detector according to claim 2, and wherein the ratio between currents measured on said first and said second surfaces is utilized to provide an indication of the hardness of said radiation.

4. A radiation detector according to claim 1, and wherein at least one group of anodes from said second plurality of anodes and cathodes are connected together, such that said at least one group of anodes collects electrons integrated over an area larger than that collected by a single anode.

5. A radiation detector according to claim 4, and wherein said plurality of first surface anodes and cathodes are generally connected together as a common cathode electrode to said detector.

6. A radiation detector according to claim 4, and wherein the number of anodes in said at least one group is sufficiently large that said detector is sensitive to gamma photon events arising from nuclear medicine imaging.

7. A radiation detector according to claim 4, and wherein said detector is usable for high photon flux photoconductivity measurements and for low photon flux photon counting measurements according to the connections of said second plurality of anodes.

8. A radiation detector according to claim 7, and wherein the determination of said at least one of the connections of said second plurality of anodes and said connections of said first plurality of anodes and cathodes is made by the detector itself according to the measured flux level.

9. A radiation detector according to claim 1 wherein said substrate comprises cadmium zinc telluride.

10. A radiation detector comprising:
    a semiconductor substrate comprising a first surface for exposure to said radiation and a second surface opposite said first surface;
    a plurality of anodes and cathodes disposed on said first surface, such that an electric field produced between at least one of said anodes and an associated cathode has a component generally parallel to said first surface; and
    at least one second anode electrode disposed on said second surface, said at least one second anode electrode being maintained at a positive potential relative to said plurality of first surface anodes and cathodes, such that said at least one second anode electrode collects electrons generated by said radiation and not measured by said first surface plurality of anodes and cathodes,
    said detector being operative to perform photoconductive current measurements at said first surface and photon counting measurements at said second surface.

11. A radiation detector according to claim 10, and wherein said at least one second anode electrode is a plurality of anodes.

12. A radiation detector according to claim 11, and wherein at least one of said second anodes of said plurality is disposed on said second surface generally opposite the location of a cathode on said first surface.

13. A radiation detector according to claim 10 and wherein said electrons collected by said at least one second anode electrode are measured by means of photon counting.

14. A radiation detector according to claim 10 and wherein said positive potential is selected such that only electrons generated from incident radiation of a predetermined hardness are measured at said second surface by means of photon counting.

15. A radiation detector according to claim 10 and wherein said positive potential is selected such that only electrons generated from incident radiation of less than a predetermined hardness are measured by means of current measurements at said first surface.

16. A radiation detector according to claim 11, and wherein at least one group of anodes from said second plurality of anodes are connected together, said at least one group of anodes collecting electrons integrated over an area larger than that collected by a single anode.

17. A radiation detector according to claim 16, and wherein said plurality of first surface anodes and cathodes are generally connected together as a common cathode electrode to said detector.

18. A radiation detector according to claim 16, and wherein the number of anodes in said at least one group is sufficiently large that said detector is sensitive to gamma photon events arising from nuclear medicine imaging.

19. A radiation detector according to claim 16, and wherein said detector is usable for high photon flux photoconductivity measurements and for low photon flux photon counting measurements according to at least one of:
    the connections of said second plurality of anodes;
    the connections of said first plurality of anodes and cathodes; and
    the level of said positive potential.

20. A radiation detector according to claim 19, and wherein the determination of said at least one of the connections of said second plurality of anodes, and said connections of said first plurality of anodes and cathodes, and said level of said positive potential, is made by the detector itself according to the measured flux level.

21. A radiation detector according to claim 10 wherein said substrate comprises cadmium zinc telluride.

22. A method of performing photon counting measurements on a radiation flux, comprising the steps of:
    providing a semiconductor substrate having a first surface for exposure to said radiation flux and a second surface opposite said first surface;
    disposing on said first surface a plurality of anodes and cathodes, such that an electric field produced between at least one of said anodes and an associated cathode has a component generally parallel to said first surface; and
    measuring the charge arising from an individual photon absorption in said substrate;
    said photon counting being performed at flux levels which generate generally conductive regions in said substrate.

23. A method of performing photon counting measurements on a radiation flux, comprising the steps of:
    providing a semiconductor substrate having a first surface for exposure to said radiation flux and a second surface opposite said first surface;

disposing on said first surface a plurality of anodes and cathodes, such that an electric field produced between at least one of said anodes and an associated cathode has a component generally parallel to said first surface;

measuring the charge arising from an individual photon absorption in said substrate; and disposing a second plurality of anodes and cathodes on said second surface, such that an electric field produced between at least one of said anodes and an associated cathode of said second plurality has a component parallel to said second surface;

said measuring the charge arising from an individual photon absorption in said substrate being performed by at least one of said second plurality of anodes.

24. A method of performing photon counting measurements on a radiation flux, comprising the steps of:

providing a semiconductor substrate having a first surface for exposure to said radiation flux and a second surface opposite said first surface;

disposing on said first surface a plurality of anodes and cathodes, such that an electric field produced between at least one of said anodes and an associated cathode has a component generally parallel to said first surface;

measuring the charge arising from an individual photon absorption in said substrate; and disposing at least one second anode electrode on said second surface, said at least one second anode electrode being maintained at a positive potential relative to said plurality of first surface anodes and cathodes;

said measuring the charge arising from an individual photon absorption in said substrate being performed by at least one of said at least one second anode electrode.

25. A radiation detector comprising:

a semiconductor substrate comprising a first surface for exposure to said radiation and a second surface opposite said first surface;

a first plurality of anodes and cathodes disposed on said first surface, such that an electric field produced between at least one of said anodes and an associated cathode has a component generally parallel to said first surface; and a second plurality of anodes disposed on said second surface, said second plurality of anodes being maintained at a positive potential relative to said first plurality of anodes and cathodes, such that said second plurality of anodes collects electrons generated by said radiation and not measured by said first plurality of anodes and cathodes, at least one group of anodes from said second plurality of anodes being connected together, said at least one group of anodes collecting electrons integrated over an area larger than that collected by a single anode, and said detector being usable for high photon flux photoconductivity measurements and for low photon flux photon counting measurements according to at least one of:

the connections of said second plurality of anodes;

the connections of said first plurality of anodes and cathodes; and the level of said positive potential.

26. A radiation detector according to claim 25, and wherein the determination of said at least one of the connections of said second plurality of anodes, and said connections of said first plurality of anodes and cathodes, and said level of said positive potential, is made by the detector itself according to the measured flux level.

* * * * *